United States Patent
Kamijo et al.

(10) Patent No.: US 9,048,474 B2
(45) Date of Patent: Jun. 2, 2015

(54) FUEL CELL SYSTEM AND METHOD FOR CONTROLLING SAME

(75) Inventors: Motohisa Kamijo, Kamakura (JP); Hiromichi Miwa, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 829 days.

(21) Appl. No.: 13/264,241

(22) PCT Filed: Apr. 15, 2010

(86) PCT No.: PCT/JP2010/056782
§ 371 (c)(1), (2), (4) Date: Oct. 13, 2011

(87) PCT Pub. No.: WO2010/134401
PCT Pub. Date: Nov. 25, 2010

(65) Prior Publication Data
US 2012/0040265 A1    Feb. 16, 2012

(30) Foreign Application Priority Data

May 20, 2009 (JP) ................................ 2009-121680

(51) Int. Cl.
*H01M 8/04* (2006.01)

(52) U.S. Cl.
CPC ........ *H01M 8/04626* (2013.01); *H01M 8/0432* (2013.01); *H01M 8/04753* (2013.01); *H01M 8/04932* (2013.01); *H01M 8/04955* (2013.01); *Y02E 60/50* (2013.01)

(58) Field of Classification Search
None
See application file for complete search history.

(56) References Cited

U.S. PATENT DOCUMENTS

| 7,491,457 | B2 | 2/2009 | Kearl et al. |
| 2004/0033398 | A1 | 2/2004 | Kearl et al. |
| 2009/0004515 | A1 | 1/2009 | Mogi et al. |
| 2009/0162711 | A1* | 6/2009 | Fujita ............................ 429/23 |

FOREIGN PATENT DOCUMENTS

| JP | 2002-358991 A | 12/2002 |
| JP | 2004-079537 A | 3/2004 |
| JP | 2004-311112 A | 11/2004 |

(Continued)

*Primary Examiner* — Patrick Ryan
*Assistant Examiner* — Wyatt McConnell
(74) *Attorney, Agent, or Firm* — Foley & Lardner LLP

(57) ABSTRACT

Disclosed is a fuel cell system which comprises a power generation means that includes a plurality of fuel cells that are connectable to one another in series or in parallel through connecting terminals, a fuel gas supply conduit through which fuel electrodes of all or part of the fuel cells are connected in series and an oxidant gas supply conduit through which air electrodes of all or part of the fuel cells are connected in series; a switching means that switches an electric connection condition between the connecting terminals and connecting means of an external load device; a fuel gas supply means that supplies the fuel gas supply conduit with a fuel gas and an oxidant gas supply means that supplies the oxidant gas supply conduit with an oxidant gas; a load detecting means that detects a load of the external load device; and a control means that selects, based on an already derived relation between overall electric power output curves corresponding to the number of the fuel cells that are mutually connected and an operation temperature zone, one of the power output curves in accordance with an input from the load detecting means and selects the number of mutually connected fuel cells that brings about the highest voltage of the fuel cells thereby to control the switching means, the fuel gas supply means and the oxidant gas supply means.

5 Claims, 11 Drawing Sheets

(56) References Cited

FOREIGN PATENT DOCUMENTS

| | | |
|---|---|---|
| JP | 2006-107819 A | 4/2006 |
| JP | 2007-509470 A | 4/2007 |
| JP | 2007-242266 A | 9/2007 |
| WO | WO 2005/038973 A1 | 4/2005 |

* cited by examiner

FUEL CELL SYSTEM AND METHOD FOR CONTROLLING SAME

TECHNICAL FIELD

The present invention relates to a fuel cell system and a method for controlling the fuel cell system. More specifically, the present invention relates to a fuel cell system and a method for controlling the fuel cell system, by which needed electric power is generated in accordance with an external load while suppressing redundant fuel consumption.

BACKGROUND ART

Hitherto, there has been proposed a fuel cell stack (see Patent Citation 1) that feeds electric power to a load device at a selected efficiency under an operating temperature, and comprises (a) a plurality of fuel cell sub-stacks and (b) an unreacted fuel conduit wherein a fuel cell in each fuel cell sub-stacks is connected to both an oxidant supply source and a fuel supply source, and the unreacted fuel conduit is connected to the fuel cells and a burner in each of the fuel cell sub-stacks, so that the unreacted fuel discharged from the fuel cells in one of the sub-stacks is permitted to flow through the unreacted fuel conduit to the burner or burners in one or two and more sub-stacks for heating the sub-stack or sub-stacks.

PRIOR ART CITATION

Patent Citation

Patent Citation 1: Japanese Unexamined Application Publication 2007-509470

DISCLOSURE OF INVENTION

Problems to be Solved by Invention

However, in the fuel cell stack described in the above-mentioned Patent Citation 1, the discharged fuel is combusted in the burner or burners for heating the cathode region, meaning that the discharged fuel is not used for generating electric power inducing the possibility of deterioration of efficiency.

The present invention is provided by taking the above-mentioned drawbacks of the hitherto-used technique into consideration and aims to provide both a fuel cell system that is able to generate electric power needed in accordance an external load without consuming redundant fuel and a method for controlling the fuel cell system.

Means for Solving the Drawbacks

Inventors have eagerly made studies on the above-mentioned drawbacks to achieve the object.

As a result, the inventors have found that the object is achieved and have made the present invention by providing a fuel gas supply conduit by which fuel electrodes and the like of a plurality of fuel cells are connected in series.

That is, the fuel cell system of the present invention comprises (a) a power generation means that includes a plurality of fuel cells that are connectable to one another in series or in parallel through connecting terminals, a fuel gas supply conduit through which fuel electrodes of all or part of the fuel cells are connected in series and an oxidant gas supply conduit through which air electrodes of all or part of the fuel cells are connected in series; (b) a switching means that switches an electric connection condition between the connecting terminals and connecting means of an external load device; (c) a fuel gas supply means that supplies the fuel gas supply conduit with a fuel gas and an oxidant gas supply means that supplies the oxidant gas supply conduit with an oxidant gas; (d) a load detecting means that detects a load of the external load device; and (e) a control means that selects, based on an already derived relation between overall electric power output curves corresponding to the number of the fuel cells that are mutually connected and an operation temperature zone, one of the power output curves in accordance with an input from the load detecting means and selects the number of mutually connected fuel cells that brings about the highest voltage of the fuel cells thereby to control the switching means, the fuel gas supply means and the oxidant gas supply means.

Effects of the Invention

In accordance with the present invention, there is provided an arrangement which comprises (a) a power generation means that includes a plurality of fuel cells that are connectable to one another in series or in parallel through connecting terminals, a fuel gas supply conduit through which fuel electrodes of all or part of the fuel cells are connected in series and an oxidant gas supply conduit through which air electrodes of all of part of the fuel cells are connected in series; (b) a switching means that switches an electric connection condition between the connecting terminals and connecting means of an external load device; (c) a fuel gas supply means that supplies the fuel gas supply conduit with a fuel gas and an oxidant gas supply means that supplies the oxidant gas supply conduit with an oxidant gas; (d) a load detecting means that detects a load of the external load device; and (e) a control means that selects, based on an already derived relation between overall electric power output curves corresponding to the number of the fuel cells that are mutually connected and an operation temperature zone, one of the power output curves in accordance with an input from the load detecting means and selects the number of mutually connected fuel cells that brings about the highest voltage of the fuel cells thereby to control the switching means, the fuel gas supply means and the oxidant gas supply means. With such arrangement, the present invention can provide a fuel cell system which is able to generate electricity needed in accordance with an external load without consuming redundant fuel.

MODE FOR CARRYING OUT THE INVENTION

Figure 1:
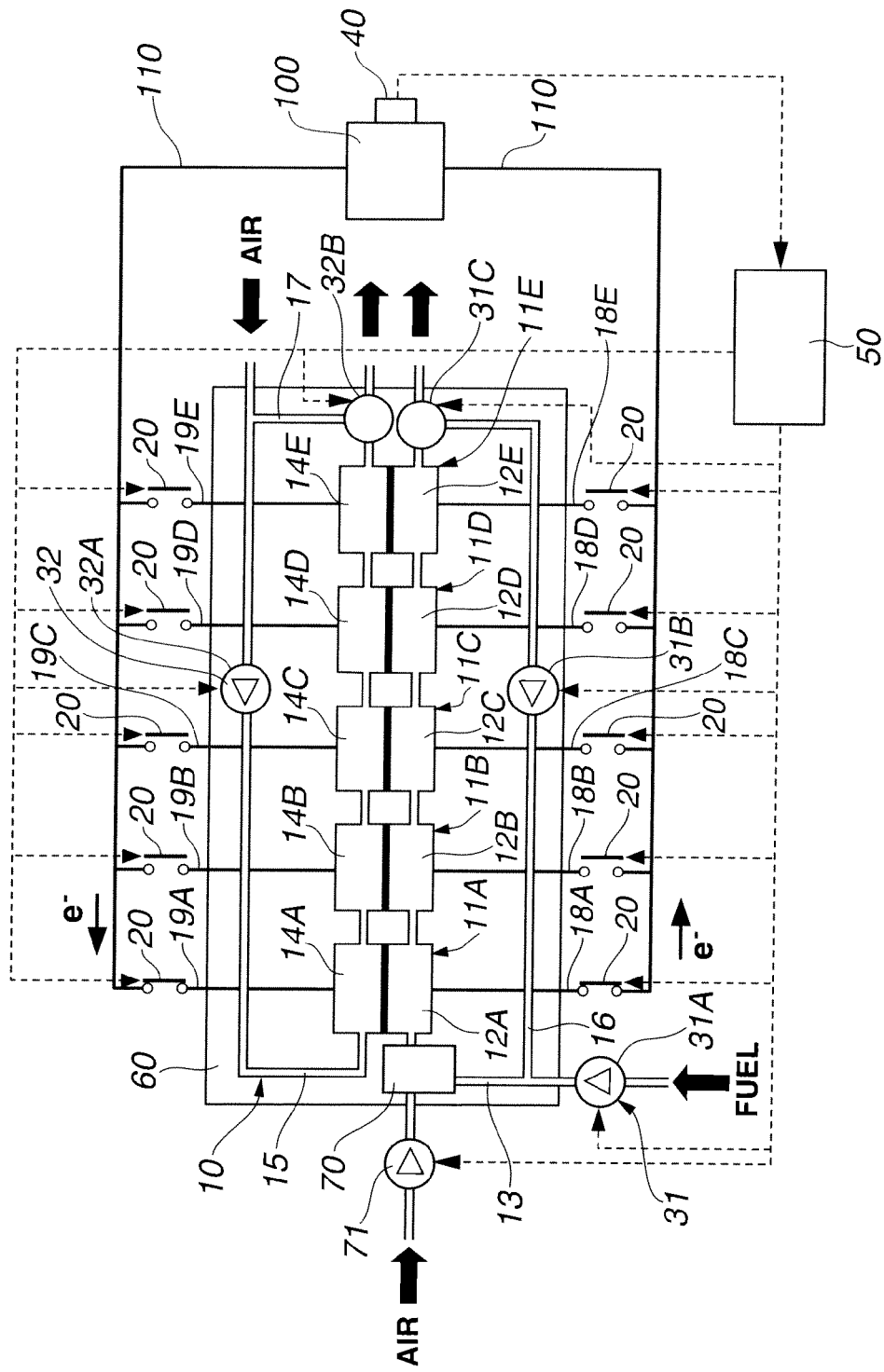
FIG. 1 is an illustration schematically showing one example (viz., first embodiment) of a fuel cell system, that is an embodiment of the invention.

In the following, a fuel cell system of an embodiment of the present invention will be described in detail.

The fuel cell system of the embodiment is a system that comprises an electric power generating means, a switching means, a fuel gas supply means, an oxidant gas supply means, a load detecting means and a control means.

The electric power generating means comprises a plurality of fuel cells, a fuel gas supply conduit through which fuel electrodes of all or part of the fuel cells are connected in series and an oxidant gas supply conduit through which air electrodes of all or part of the fuel cells are connected in series. These fuel cells are electrically connectable to one another in series or parallel or in both series and parallel through connecting terminals.

The switching means is a means for switching an electric connection condition between the connecting terminals and connecting means of an external load device.

The fuel gas supply means is a means for feeding the fuel gas supply conduit with a fuel gas, and the oxidant gas supply means is a means for feeding the oxidant gas supply conduit with an oxidant gas.

Furthermore, the load detecting means is a means for detecting a load of the external load device.

Furthermore, the control means is a means for controlling the switching means, the fuel gas supply means and the oxidant gas supply means in accordance with an input from the load detecting means based on an already derived relation between overall electric power output curves corresponding to the number of mutually connected fuel cells and an operation temperature zone.

The fuel cell system having the above-mentioned construction is able to have a high efficient standby condition without consuming redundant fuel, and thus, the system is able to generate electric power needed in accordance with the external load.

That is, by providing an arrangement that includes the fuel gas supply conduit through which fuel electrodes of at least part of the fuel cells are connected in series and the oxidant gas supply conduit through which air electrodes of at least part of the fuel cells are connected in series, a high temperature gas is permitted to flow from the fuel cells located at an upstream side to the fuel cells located at downstream side.

Let us consider a case wherein the electric connection between the connecting terminals of the downstream fuel cells and the connecting means of the external load device is blocked by the switching means thereby to stop the electric power generation by the downstream fuel cells.

In this case, the temperature of the downstream fuel cells gradually approaches to an output temperature of the upstream fuel cells.

Actually, because of reduction of temperature due heat radiation, the temperature of the downstream fuel cells fail to show the same temperature as the output temperature. However, by suitably setting the arrangement condition of the fuel cells, the fuel gas supply conduit and the oxidant gas supply conduit, the temperature reduction can be controlled and thus, when the connection is carried out again by the switching means, the temperature can show a level that does not affect the electric power generation.

When, with the downstream fuel cells stopping power generation, the fuel gas is kept in the fuel gas supply conduit and at the same time, the oxidant gas is kept in the oxidant gas supply conduit, the fuel cells can be kept in a standby condition, that is, in an open circuit (OCV) condition.

Thus, the fuel cells in a high temperature condition can prevent the fuel electrodes from oxidation and the air electrodes from reduction. Since the downstream fuel cells are ceasing power generation, the downstream fuel cells are suppressed from having reduction in fuel gas and oxidant gas.

It is to be noted that the fuel cell is a device that includes at least one unit fuel cell that is able to generate electric power by itself and a fuel cell stack is to be understood as the fuel cell.

Accordingly, when, in the fuel cell, the unit fuel cells are coupled in series, the current flowing in each unit fuel cell of the fuel cell shows a constant level. Furthermore, when, in the fuel cell, the unit fuel cells are coupled in parallel, the terminal voltage of each unit fuel cell of the fuel cell shows a constant level.

In the fuel cell system of the embodiment of the invention, it is preferable to provide both the fuel gas supply conduit and oxidant gas supply conduit with respective circulation conduits.

The fuel cell system having the above-mentioned construction is able to have a high efficient standby condition without consuming redundant fuel, and thus, the system is able to generate electric power needed in accordance with the external load and there is no need of constantly keeping the most upstream fuel cell in a power generating condition. Accordingly, if any of the fuel cells is kept in a power generation condition, the other full cell connected to the ON fuel cell through the circulation conduits can be brought to a standby condition, and thus, selection of fuel cells can be made in accordance with deterioration and the like of the fuel cells. Furthermore, the fuel cell system can be reduced in size by removal of combustor that heats the gas and removal of heat exchanger, which is an advantage.

Furthermore, in the fuel cell system of the embodiment of the invention, it is preferable that the plurality of fuel cells, the fuel gas supply conduit and the oxidant gas supply conduit are installed in a heat insulating means.

The fuel cell system having such construction is able to have a high efficient standby condition without consuming redundant fuel, and thus, the system is able to not only generate electric power needed in accordance with the external load but also keep the temperature of each fuel cell in power generating condition or standby condition at a constant level. Particularly, due to the arrangement wherein all of the fuel cells are enclosed in the heat insulating means, variations in the performance and deterioration of each fuel cell can be restrained.

In the fuel cell system of the embodiment of the invention, it is preferable that the control means controls the switching means in accordance with a need of power generation output and heat from an external load device.

The fuel cell system having such construction is able to have a high efficient standby condition without consuming redundant fuel, and thus, the system is able to not only generate electric power needed in accordance with the external load but also select the optimum operation condition of the system in accordance with the need of power generation output and heat from the external load device.

Furthermore, in the fuel cell system of the embodiment of the invention, for causing the control means to control the switching means in accordance with the need of power generation output and heat from the external load device, it is preferable to control the number of mutually connected fuel cells based on an operation map prepared for each number of mutually connected fuel cells.

The fuel cell system having such construction is able to have a high efficient standby condition without consuming redundant fuel, and thus, the system is able to generate electric power needed in accordance with the external load. Furthermore, the system is able to have a controlling target that is not affected by a transition fluctuation that appears when the operation condition of the system changes, and thus, changing the operation condition of the system can be smoothly carried out.

Furthermore, in the fuel cell system of the embodiment of the invention, for causing the control means to control the switching means in accordance with a need of low electric power generation output from an external load, it is preferable to reduce the number of mutually connected fuel cells based on the operation map prepared for each number of mutually connected fuel cells.

It is to be noted that the "need of low electric power generation output" means a need of electric power generation output that can not keep the temperature needed for providing a heat balance of the fuel cell system during the time for which each fuel cell continues to generate electric power in accordance with the need of electric power generation output.

The fuel cell having the above-mentioned construction is able to have a high efficient standby condition without consuming redundant fuel and thus, the system is able to generate electric power needed in accordance with the external load. Furthermore, the system is able to have a controlling target that is not affected by a transition fluctuation that appears when the operation condition of the system changes, and thus, changing the operation condition of the system can be smoothly carried out. Furthermore, since the fuel combustion that does not directly contribute the electric power generation is restricted, so-called overall efficiency provided by combination of the amount of generated electric power and the amount of radiation heat.

That is, under a low output operation, the power generation efficiency increases basically, and with increase of the number of fuel cells, the power generation efficiency increases. With such increase, the amount of heat radiation from the fuel cells decreases. Accordingly, when the need for the power generation output becomes lower than a predetermined level, there would be produced such a possibility that the amount of heat radiation from the fuel cells becomes lower than a level that keeps the heat balance of the system. Even in this case, by reducing the number of mutually connected fuel cells to increase the amount of heat radiation from the fuel cells, combustion of fuel in combustors can be avoided.

Furthermore, in the fuel cell system of the embodiment of the invention, for causing the control means to control the switching means in accordance with a need of high heat from the external load device, it is preferable to reduce the number of mutually connected fuel cells based on an operation map prepared for each number of mutually connected fuel cells.

It is to be noted that the "need of high heat" means a need of the amount of radiation heat that exceeds the amount of heat that naturally radiates from the fuel cells, the fuel gas supply means and oxidant gas supply means which are elements of the electric power generating means.

The fuel cell system having the above-mentioned construction is able to have a high efficient standby condition without consuming redundant fuel and thus, the system is able to generate electric power needed in accordance with the external load. Furthermore, the system is able to have a controlling target that is not affected by a transition fluctuation that appears when the operation condition of the system changes, and thus, changing the operation condition of the system can be smoothly carried out. Furthermore, under a condition wherein the need for heat is high, it is possible to increase the overall efficiency that is provided by combination of amount of generated electric power and amount of radiation heat.

First Embodiment

In the following, one example of the fuel cell system of the embodiment will be described in detail with reference to drawings.

FIG. 1 is an illustration that schematically shows one example of the fuel cell system which is the embodiment. As is shown in the drawing, the fuel cell system comprises an electric power generating means 10, a switching means 20, a fuel gas supply means 31, an oxidant gas supply means 32, a load detecting means 40 and a control means 50.

The electric power generating means 10 comprises five solid oxide fuel cells 11A to 11E, a fuel gas supply conduit 13 through which fuel electrodes 12A to 12E of all of the five solid oxide fuel cells are connected in series and an oxidant gas supply conduit 15 through which air electrodes 14A to 14E of all of the five solid oxide fuel cells are connected in series.

In the example, the fuel gas supply conduit 13 and the oxidant gas supply conduit 15 are equipped with circulation conduits 16 and 17 respectively.

Furthermore, in the example, the solid oxide fuel cells 11A to 11E, the fuel gas supply conduit 13, the oxidant gas supply conduit 15 and the circulation conduits 16 and 17 are installed in a heat insulating means 60 that is made of a heat insulating material.

Furthermore, in the example, the five solid oxide fuel cells 11A to 11E have each a so-called fuel cell stack in which unit fuel cells (not shown) are connected in series.

As is seen from FIG. 1, the solid oxide fuel cells 11A to 11E are electrically connectable to one another in parallel through connecting terminals 18A to 18E and 19A to 19E.

The switching means 20 is a means for switching an electric connection between the connecting terminals 18A to 18E and 19A to 19E and for example a connecting means 110 of an external load device (motor), and in the example, a switch is used as the switching means. The connecting means 110 is a circuit that is equipped with an inverter (not shown).

The fuel gas supply means 31 is a device for feeding the fuel gas supply conduit 13 with a fuel gas, and in the example, the means 31 comprises fuel pumps 31A and 31B and a flow rate adjusting device 31C. The oxidant gas supply means 32 is a device for feeding the oxidant gas supply conduit 15 with an oxidant gas, and in the example, the means 32 comprises an air blower 32A and a flow rate adjusting device 32B.

The load detecting means 40 is a device for detecting a load of the external load device (motor) 100, in the example, the load detecting means is an accelerator open degree sensor.

The control means 50 is a device for outputting instructions to the switching means 20, the fuel gas supply means 31 and the oxidant gas supply means 32 in accordance with an information inputted thereto from the load detecting means 40. The control means 50 may be a control device that stores maps each showing a relation among an after-mentioned electric power generation output, an electric power generation efficiency and an amount of heat radiation that are provided with reference to the number of mutually connected fuel cells and a terminal voltage (or current density), and outputs instructions based on information inputted thereinto.

In the fuel cell system of the example, there is arranged a fuel reformer 70 at a position upstream of the fuel gas supply conduit 13. The fuel reformer 70 produces a reformed fuel by processing air fed by an air blower 71, the fuel fed by the fuel pumps 31A and 31B and flow rate adjusting device 31C and water.

Figure 2:
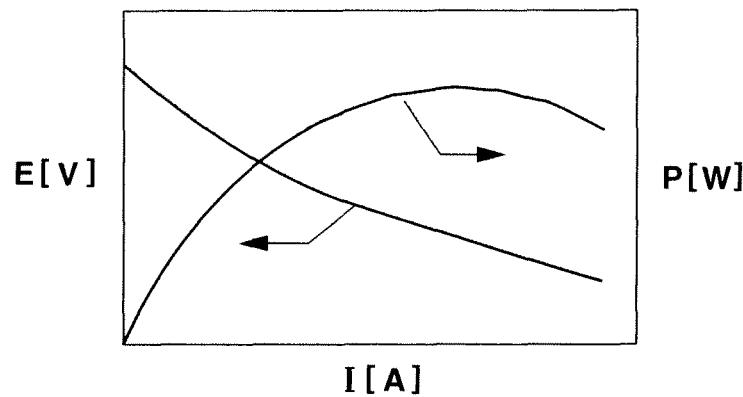
FIG. 2 is a graph that depicts both a current (I)-voltage (V) characteristic and a current (I)-electric power output (P) characteristic in the example of the fuel cell system, that is the embodiment of the invention.

In the example, each fuel cell has a current (I)-voltage (V) characteristic and a current (I)-electric power output (P) characteristic, as shown in FIG. 2.

As is seen from the drawing, in each fuel cell, with increase of current, voltage lowers. Furthermore, in each fuel cell, when current shows a given value, the electric power output indicates the highest value.

Figure 3:
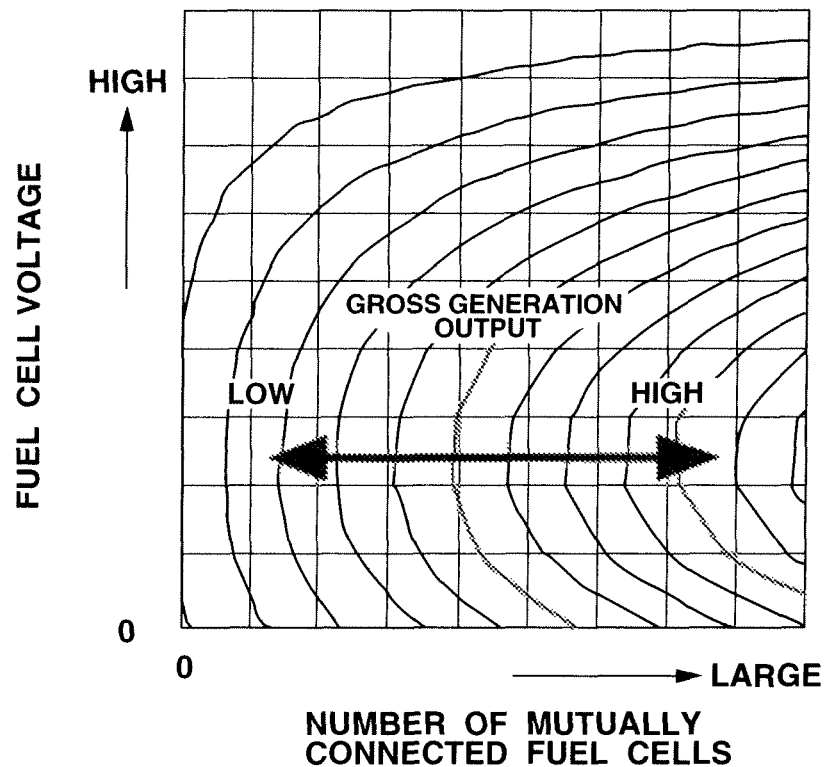
FIG. 3 is a map that depicts a relation among the number of mutually connected fuel cells, a fuel cell voltage (viz., terminal voltage) and a gross power generation output in the example of the fuel cell system, that is the embodiment of the invention.

A map showing a relation among the number of mutually connected fuel cells, the fuel cell voltage (viz., terminal voltage) and a gross generation output (viz., output provided without consideration of power consumption of an auxiliary device) is shown in FIG. 3.

As is seen from the map, as the number of mutually connected fuel cells decreases, the gross generation output decreases and as the number of mutually connected fuel cells increases, the gross generation output increases, and in each number of mutually connected fuel cells, the gross generation output has a peak relative to the fuel cell voltage (which corresponds to the voltage of the fuel cell system because of the parallel connection). As the voltage is higher than the peak, the gross generation output becomes lower, and when the voltage is lower than the peak, the gross generation output is lowered.

Figure 4A:
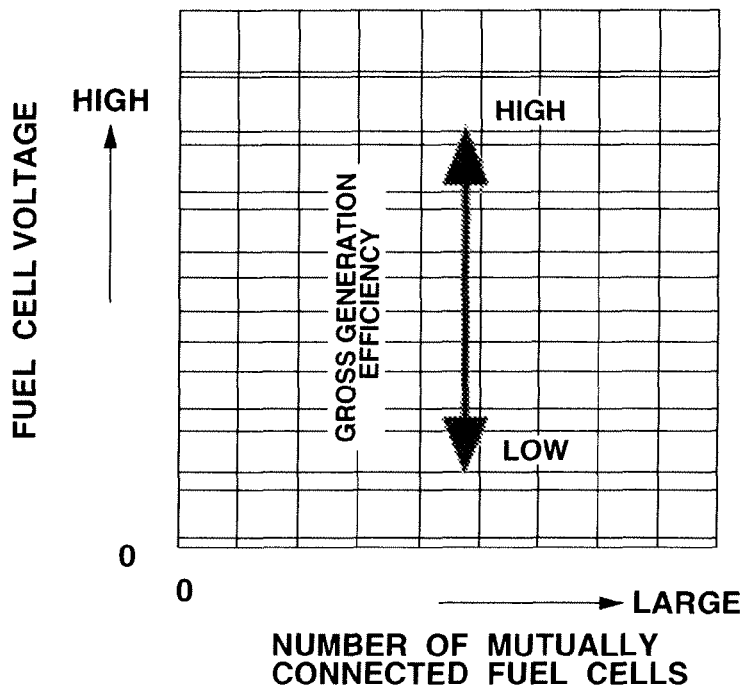
FIG. 4A is a plan view showing a relation map that depicts a relation among the number of mutually connected fuel cells, the fuel cell voltage and a gross power generation efficiency in the example of the fuel cell system, that is the embodiment of the invention.
Figure 4B:
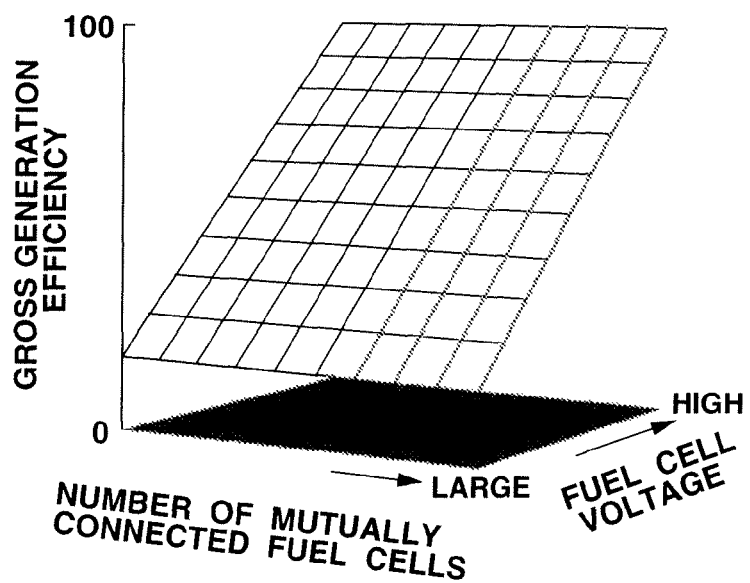
FIG. 4B is a stereograph showing a relation map that depicts a relation among the number of mutually connected fuel cells, the fuel cell voltage and the glass power generation efficiency in the example of the fuel cell system, that is the embodiment of the invention.

FIGS. 4A and 4B are respectively plan and perspective views of maps that show each a relation among the number of mutually connected fuel cells, the fuel cell voltage and a gross generation efficiency (viz., efficiency prepared without consideration of power consumption of an auxiliary device).

As is seen from the maps, as the voltage increases, the gross generation efficiency increases regardless of the number of mutually connected fuel cells.

Figure 5:
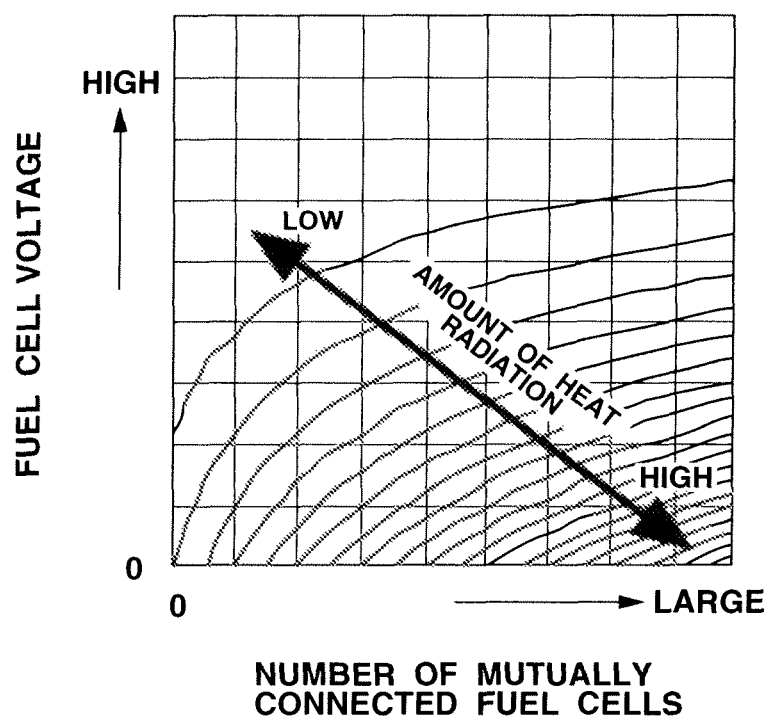
FIG. 5 is a map that depicts a relation among the number of mutually connected fuel cells, the fuel cell voltage and an amount of heat radiation from all of the fuel cells in the example of the fuel cell system, that is the embodiment of the invention.

A map indicating a relation among the number of mutually connected fuel cells, the fuel cell voltage (viz., terminal voltage) and an amount of radiation heat from all of the fuel cells is shown in FIG. 5.

As is seen from the map, as the number of mutually connected fuel cells decreases, the amount of radiation heat decreases and as the number of mutually connected fuel cells increases, the amount of heat radiation increases. As the fuel cell voltage (which corresponds to the voltage of the fuel cell system because of the parallel connection) increases, the amount of heat radiation decreases and as the fuel cell voltage decreases, the amount of heat radiation increases.

Figure 6A:
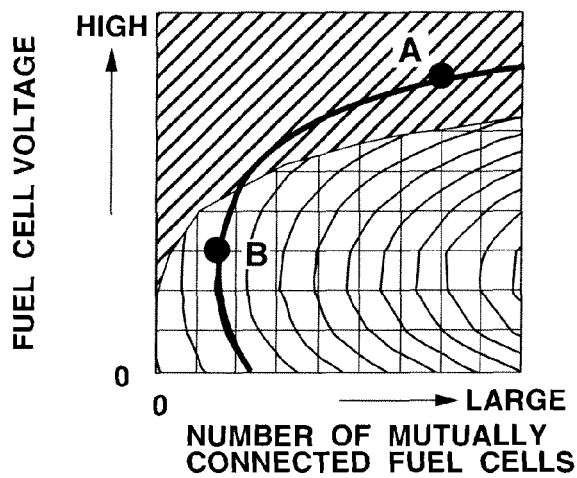
FIG. 6A is a map that depicts a relation among the number of mutually connected fuel cells, the fuel cell voltage and a gross power generation output in the example of the fuel cell system, that is the embodiment of the invention.
Figure 6B:
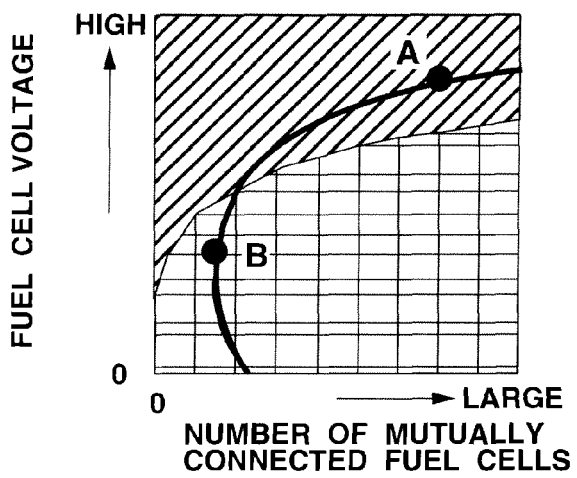
FIG. 6B is a map that depicts a relation among the number of mutually connected fuel cells, the fuel cell voltage and a gross power generation efficiency in the example of the fuel cell system, that is the embodiment of the invention.
Figure 6C:
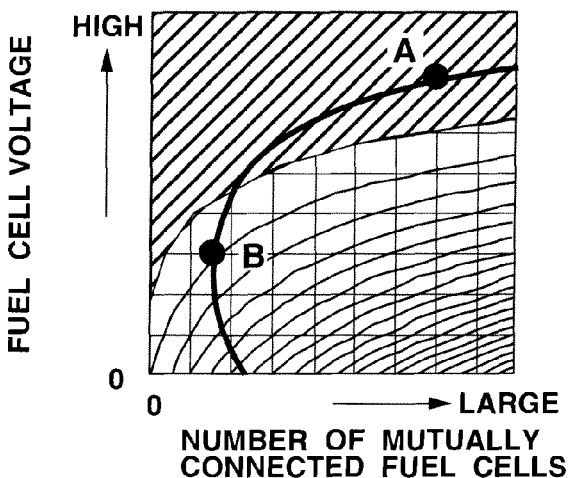
FIG. 6C is an illustration or map that depicts a relation among the number of mutually connected fuel cells, the fuel cell voltage and the amount of heat radiation from all of the fuel cells in the example of the fuel cell system, that is the embodiment of the invention.

In the fuel cell system of the example, when there is a need of gross generation output from the outside (for example in a case that the thick curved line of FIG. 6A indicates), the gross generation efficiency indicated by the thick curved line of FIG. 6B and the amount of heat radiation indicated by the thick curved line of FIG. 6C are achieved by controlling the number of mutually connected fuel cells and the fuel cell voltage.

However, when the input is a need for a low generation output, basically the gross generation efficiency increases. Particularly, as the number of mutually connected fuel cells increases, the gross generation efficiency increases. With this, the amount of heat radiation from the fuel cells decreases Hatched zones of FIGS. 6A, 6B and 6C show a range in which the amount of heat radiation from the fuel cells is lower than a level that keeps the heat balance of the fuel cell system. In this range, the hitherto used fuel cell system needs a combustion of added fuel in burners and thus shows a poor efficiency, as a whole.

While, in the fuel cell system of the example of the invention, for operation of the system, by reducing the number of mutually connected fuel cells thereby to operate the system on the point "B" not on the point "A", the amount of heat radiation can be increased while satisfying the need of the gross generation output can be increased.

As is mentioned hereinabove, in the fuel cell system of the example of the invention, a high efficient standby condition can be obtained without consuming redundant fuel and thus, it is possible to generate electricity in accordance with the need of the external load device. Furthermore, it is possible to have a controlling target that is not affected by a transition fluctuation that appears when the operation condition of the system is subjected to change, and thus, changing the operation condition of the system can be smoothly carried out. Furthermore, since the fuel combustion that does not directly contribute the electric power generation is restricted, so-called overall efficiency provided by combination of the amount of the generated electric power and the amount of radiation heat can be increased.

Figure 7A:
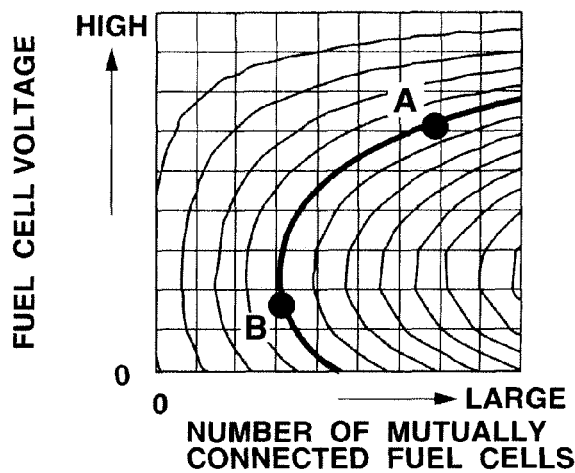
FIG. 7A is a map that depicts a relation among the number of mutually connected fuel cells, the fuel cell voltage and the gross power generation output in the example of the fuel cell system, that is the embodiment of the invention. It is to be noted that this map is used for considering the fuel cell system of the embodiment from a viewpoint different from that directed to the map of FIG. 6A.
Figure 7B:
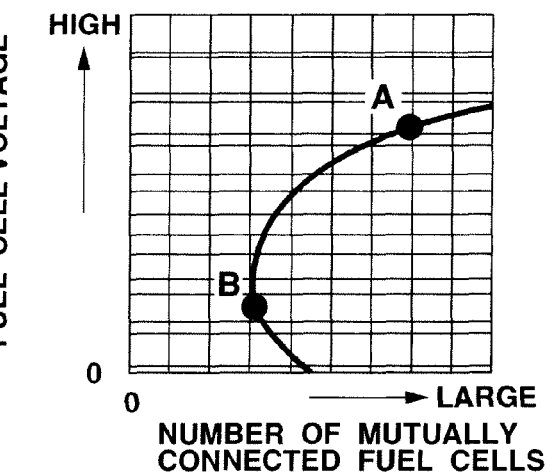
FIG. 7B is a map that depicts a relation among the number of mutually connected fuel cells, the fuel cell voltage and the gross power generation efficiency in the example of the fuel cell system, that is the embodiment of the invention. It is to be noted that this map is used for considering the fuel cell system of the embodiment from a viewpoint different from that directed to the map of FIG. 6B.
Figure 7C:
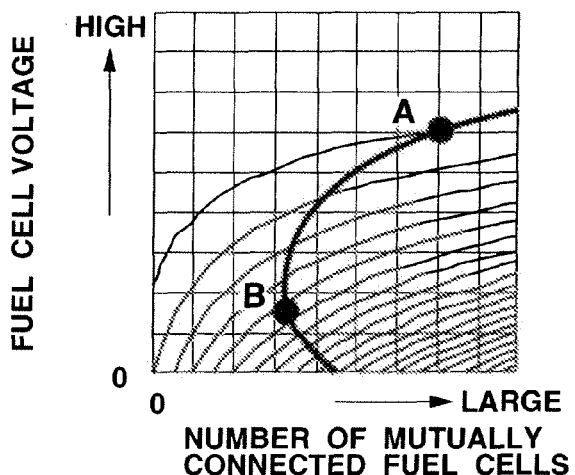
FIG. 7C is a map that depicts a relation among the number of mutually connected fuel cells, the fuel cell voltage and the amount of heat radiation from all of the fuel cells in the example of the fuel cell system, that is the embodiment of the invention. It is to be noted that this map is used for considering the fuel cell system of the embodiment from a viewpoint different from that directed to the map of FIG. 6C.

Furthermore, in the fuel cell system of the example of the invention, when there is a need of a gross generation output from the outside (for example, a case wherein a value is represented by the thick curved line of FIG. 7A), both the gross generation efficiency represented by the thick curved line of FIG. 7B and the amount of heat radiation represented by the thick curved line of FIG. 7C can be obtained by only controlling both the number of mutually connected fuel cells and the fuel cell voltage.

When there is a need of low heat, increase of the gross generation output can be achieved by operating the system with an increased number of mutually connected fuel cells (for example, the case in which the operation is effected on the point "A").

While, there is a need of high heat, an increased amount of the heat radiation can be achieved while satisfying the need of the gross generation output by, for example, reducing the number of mutually connected fuel cells thereby to operate the system on the point "B" not on the point "A".

As is mentioned hereinabove, in the fuel cell system of the example of the invention, a high efficient standby condition is possible without consuming redundant fuel, and thus, it is possible to generate needed electricity in accordance with the load of the external load device. Furthermore, it is possible to have a controlling target that is not affected by a transition fluctuation that appears when the operation condition of the system changes, and thus, changing the operation condition of the system can be smoothly carried out. Furthermore, by restricting a fuel combustion that does not directly contribute the electric power generation, the overall efficiency provided by combination of the amount of the generated electric power and the amount of radiation heat can be increased.

Figure 8:
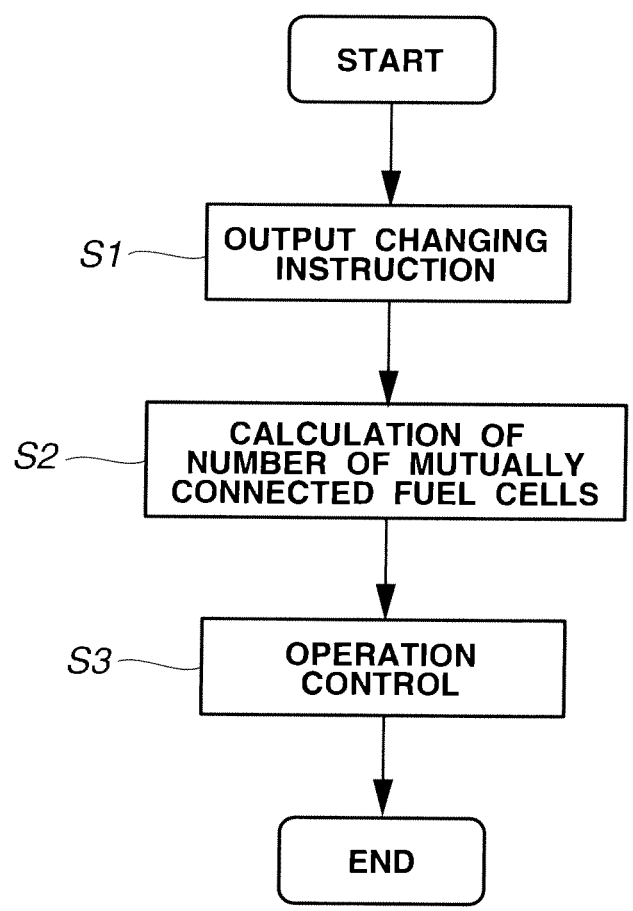
FIG. 8 is a flowchart depicting operation of the fuel cell system of the embodiment.

Operation of the fuel cell system of the example will be described with reference to FIG. 8. FIG. 8 is a flowchart that depicts the operation of the fuel cell system.

Step 1 (which will be simply represented by "S1" in the drawing and other steps following step 1 will be represented in the same fashion) is a step in which an output changing instruction including instruction on need of power generation output or instruction on need of heat is inputted into the control means from an external device. Then, the operation flow goes to step 2.

At step 2, an operation point, that is, the number of mutually connected fuel cells is calculated with reference to operation maps of FIGS. 3 to 5, and the number is selected. In this case, the operation point is so selected as to avoid operation points provided in the hatched zones of FIGS. 6A, 6B and 6C. Then, the program flow goes to step 3. The above-mentioned control corresponds to a control for selecting operation points such as the points "A" and "B" in the graphs FIGS. 6A, 6B and 6C and FIGS. 7A, 7B and 7C.

At step 3, in order to realize the operation point selected, the number of mutually connected fuel cells is controlled by making a switching operation to the switch, and the fuel gas flow rate and the air flow rate are controlled by controlling both the fuel gas supply means and oxidant gas supply means. After completing these controls, the operation is brought to a normal operation.

It is to be noted that the number of mutually connected fuel cells is represented the horizontal axes of operation maps of FIGS. 3 to 5. Furthermore, the fuel gas flow rate and the air flow rate are values that are previously set with reference to the operation map of FIG. 3 that depicts the relation among the number of mutually connected fuel cells, the fuel cell voltage and the gross generation output and the operation maps of FIGS. 4A and 4B that depict the relation among the number of mutually connected fuel cells, the fuel cell voltage and the gross generation efficiency.

Second Embodiment

In the following, another example of the fuel cell system of the embodiment will be described in detail with reference to drawings.

Figure 9:
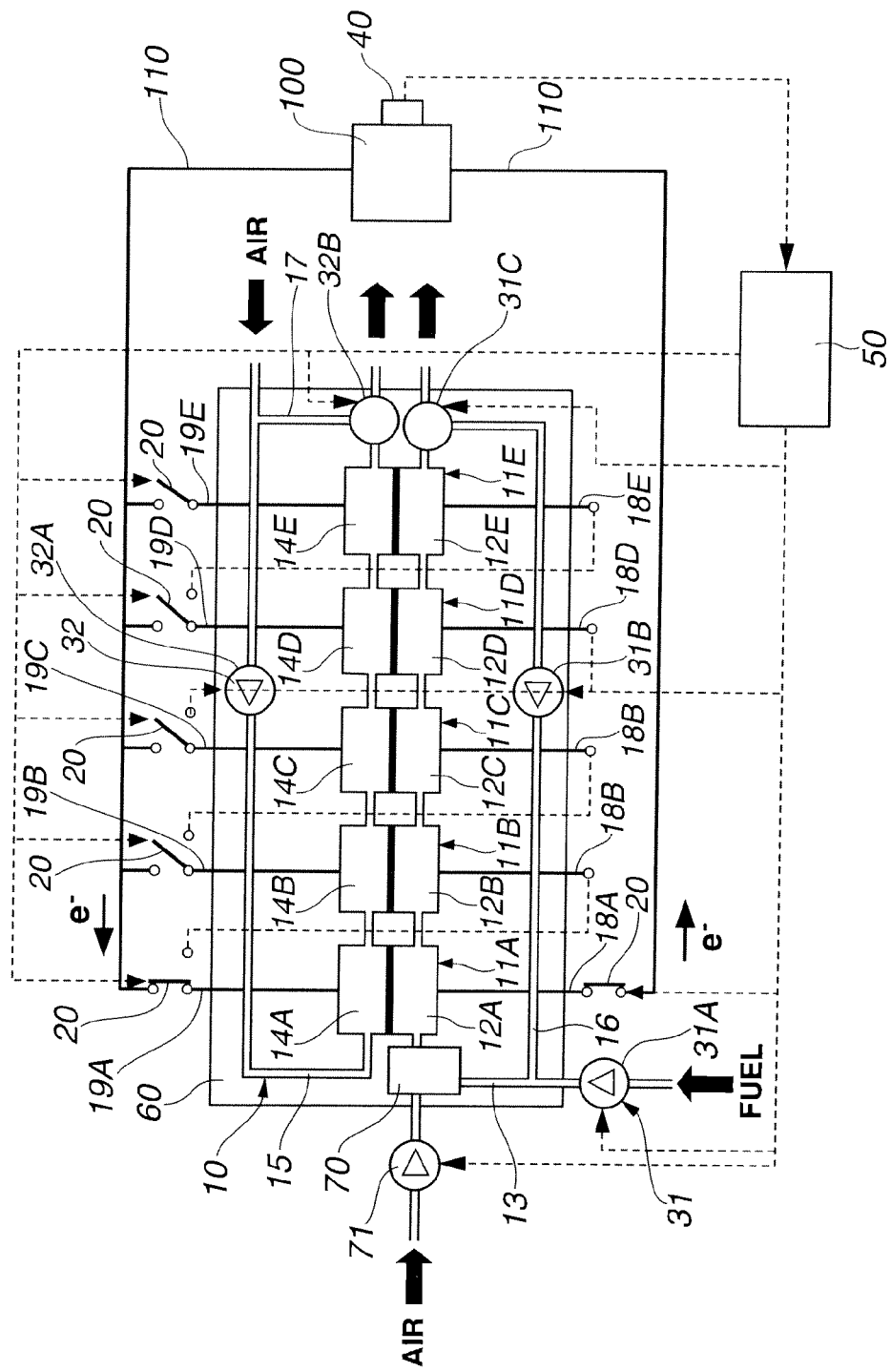
FIG. 9 is an illustration schematically showing the other example (viz., second embodiment) of a fuel cell system, that is the other embodiment of the invention.

FIG. 9 is an illustration that schematically shows the other example of the fuel cell system which is the embodiment. As is shown in the drawing, the fuel cell system comprises an electric power generating means 10, a switching means 20, a fuel gas supply means 31, an oxidant gas supply means 32, a load detecting means 40 and a control means 50.

The electric power generating means 10 comprises five solid oxide fuel cells 11A to 11E, a fuel gas supply conduit 13 through which fuel electrodes 12A to 12E of all of the five solid oxide fuel cells are connected in series and an oxidant gas supply conduit 15 through which air electrodes 14A to 14E of all of the five solid oxide fuel cells are connected in series.

In the example, the fuel gas supply conduit 13 and the oxidant gas supply conduit 15 are equipped with circulation conduits 16 and 17 respectively.

Furthermore, in the example, the solid oxide fuel cells 11A to 11E, the fuel gas supply conduit 13, the oxidant gas supply conduit 15 and the circulation conduits 16 and 17 are installed in a heat insulating means 60 that is made of a heat insulating material.

Furthermore, in the example, the five solid oxide fuel cells 11A to 11E have each a so-called fuel cell stack in which unit fuel cells (not shown) are connected in series.

As is seen from FIG. 9, the solid oxide fuel cells 11A to 11E are electrically connectable to one another in series through connecting terminals 18A to 18E and 19A to 19E.

The switching means 20 is a means for switching an electric connection between the connecting terminals 18A to 18E and 19A to 19E and for example a connecting means 110 of an external load device (motor), and in the example, a switch is used as the switching means. The connecting means 110 is a circuit that is equipped with an inverter (not shown). The fuel gas supply means 31 is a device for feeding the fuel gas supply conduit 13 with a fuel gas, and in the example, the means 31 comprises fuel pumps 31A and 31B and a flow rate adjusting device 31C. The oxidant gas supply means 32 is a device for feeding the oxidant gas supply conduit 15 with an oxidant gas, and in the example, the means 32 comprises an air blower 32A and a flow rate adjusting device 32B. The load detecting means 40 is a device for detecting a load of the external load device (motor) 100, in the example, the detecting means is an accelerator.

The control means 50 is a device for outputting instructions to the switching means 20, the fuel gas supply means 31 and the oxidant gas supply means 32 in accordance with an information inputted thereto from the load detecting means 40. The control means 50 may be a control device that stores maps each showing a relation among an after-mentioned number of mutually connected fuel cells, a gross generation output based on a fuel cell voltage (viz., terminal voltage), a gross generation efficiency and the amount of radiation heat, and outputs instructions based on information inputted thereinto.

In the fuel cell system of the example, there is arranged a fuel reformer 70 at a position upstream of the fuel gas supply conduit 13. The fuel reformer 70 produces a reformed fuel by processing air fed by an air blower 71, the fuel fed by the fuel pumps 31A and 31B and flow rate adjusting device 31C and water.

Figure 10:
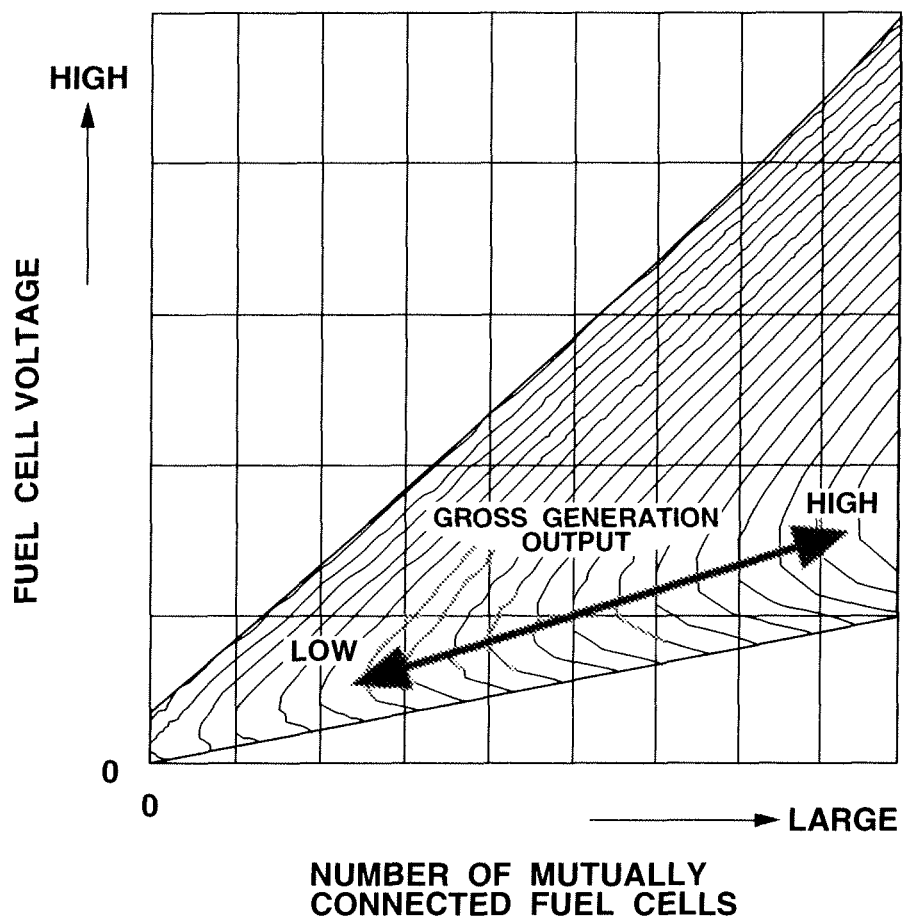
FIG. 10 is a map that depicts a relation among the number of mutually connected fuel cells, a fuel cell voltage (viz., terminal voltage) and a gross power generation output in the other example of the fuel cell system, that is the other embodiment of the invention.

A map showing a relation among the number of mutually connected fuel cells, the fuel cell voltage and a gross generation output (viz., output provided without consideration of power consumption of an auxiliary device) is shown in FIG. 10.

As is seen from the map, as the number of mutually connected fuel cells decreases, the gross generation output decreases, and as the number of mutually connected fuel cells increases, the gross generation output increases. And in each number of mutually connected fuel cells, the gross generation output has a peak relative to the fuel cell voltage. As the fuel cell voltage is higher than the peak, the gross generation output becomes lower, and when the fuel cell voltage is lower than the peak, the gross generation output is lowered.

Figure 11:
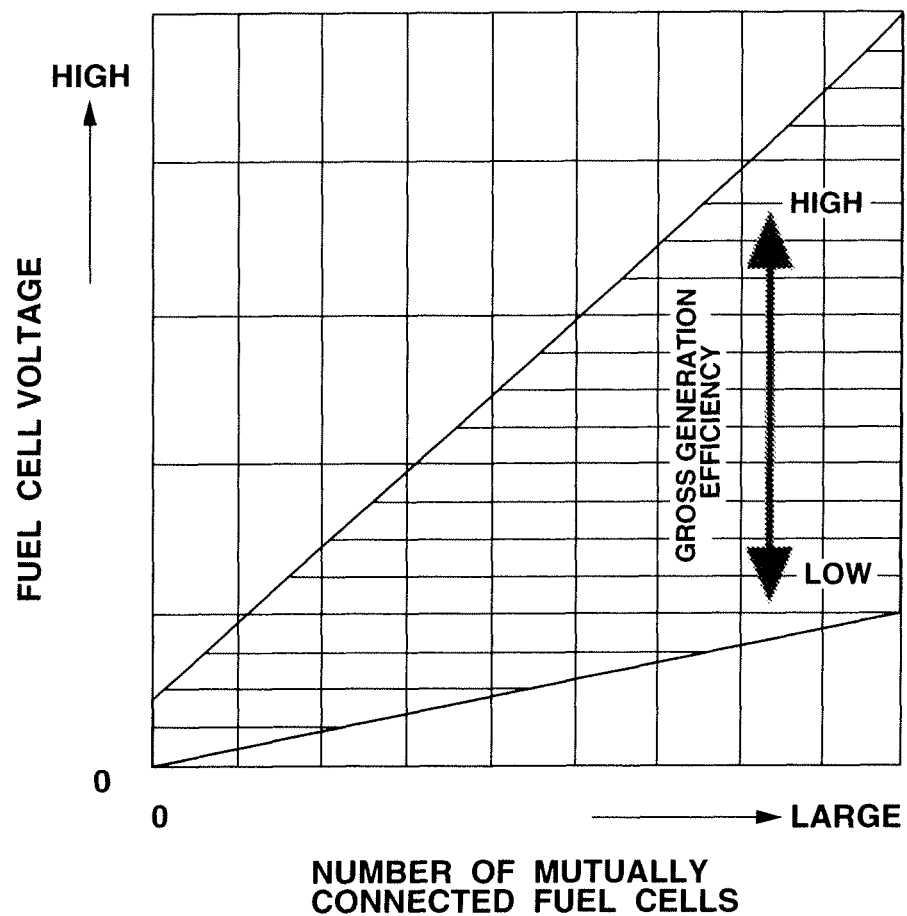
FIG. 11 is a map that depicts a relation among the number of mutually connected fuel cells, the fuel cell voltage and a gross power generation efficiency in the other example of the fuel cell system, that is the other embodiment of the invention.

A map showing a relation among the number of mutually connected fuel cells, the fuel cell voltage and the gross generation efficiency (viz., the efficiency provided without consideration of power consumption of an auxiliary device) is shown in FIG. 11.

As is seen from the map, as the number of mutually connected fuel cells increases, the gross generation efficiency increases, and as the fuel cell voltage increases, the gross generation efficiency increases.

Figure 12:
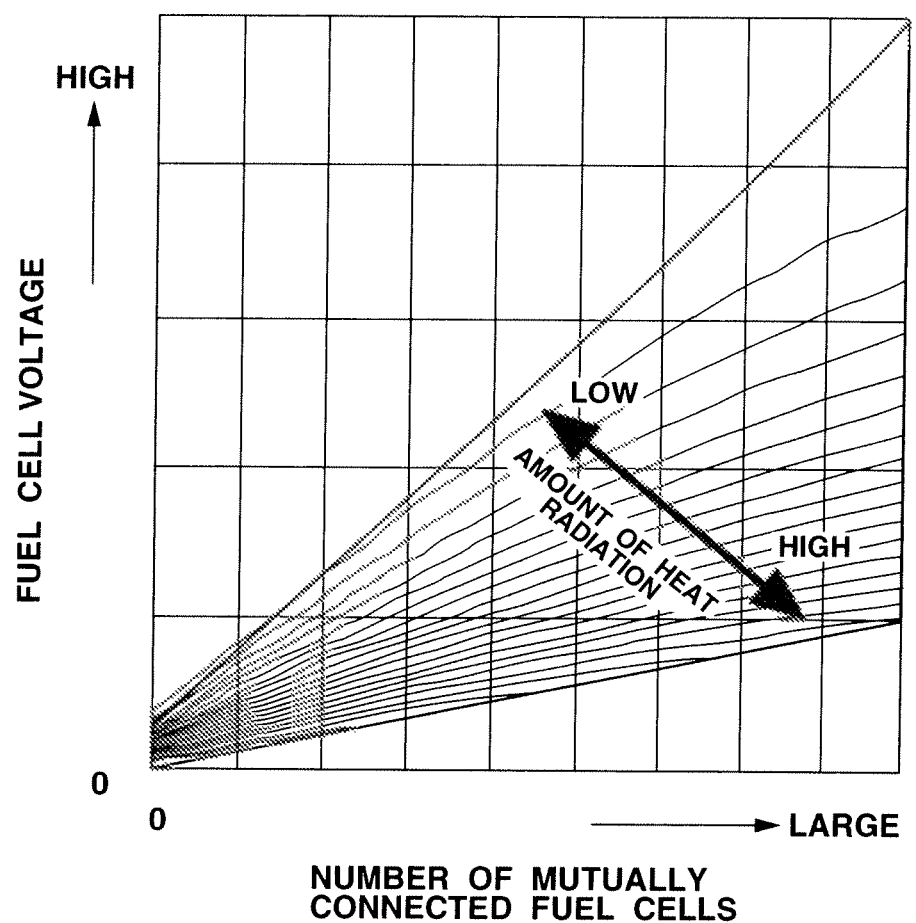
FIG. 12 is a map that depicts a relation among the number of mutually connected fuel cells, the fuel cell voltage and the amount of heat radiation from all of the fuel cells in the other example of the fuel cell system, that is the other embodiment of the invention.

A map showing a relation among the number of mutually connected fuel cells, the fuel cell voltage and the amount of heat radiation is shown in FIG. 12.

As is shown in the map, as the number of mutually connected fuel cells decreases, the amount of heat radiation increases, and as the number of mutually connected fuel cells increases, the amount of heat radiation decreases. Furthermore, as the fuel cell voltage decreases, the amount of heat radiation increases and as the fuel cell voltage increases, the amount of heat radiation from all of the fuel cells decreases.

Also in the fuel cell system of the example, an operation control similar to that of the above-mentioned first embodiment can be carried out.

That is, step 1 is a step in which an output changing instruction including instruction on need of power generation output or instruction on need of heat is inputted into the control means from an external device. Then, the operation flow goes to step 2.

At step 2, an operation point, that is, the number of mutually connected fuel cells is calculated with reference to the operation maps of FIGS. 10 to 12m and the number is selected. Then, the operation flow goes to step 3. This selection corresponds to a selection of operation points such as the points "A" and "B" in the graphs FIGS. 6A, 6B and 6C and FIGS. 7A, 7B and 7C.

At step 3, switching operation is effected by the switch to control the number of mutually connected fuel cells for realizing the operation point set, and the fuel gas flow rate and the air flow rate are controlled by controlling both the fuel gas supply means and oxidant gas supply means. After completing these controls, the operation is brought to a normal operation.

It is to be noted that the number of mutually connected cells is represented by the horizontal axes of operation maps of FIGS. 10 to 12. Furthermore, the fuel gas flow rate and the air flow rate are values that are previously set with reference to the operation of FIG. 10 that depicts the relation among the number of mutually connected fuel cells, the fuel cell voltage and the gross generation output and the operation map of FIG. 11 that depicts the relation among the number of mutually connected fuel cells, the fuel cell voltage and the gross generation output.

As is apparent from the above, the present invention has been described with reference to the two embodiments. However, the present invention is not limited to such embodiments. That is, various modifications are possible in the scope of the invention.

In the above, only two cases one being a case (first embodiment) wherein the fuel cells are connectable in parallel and the other being case (second embodiment) wherein the full cells are connectable in series are described. However, it is needless to say that the present invention is applicable to a case wherein the fuel cells are connectable through parallel and series connections.

For example, it is possible to replace each of the fuel cells of the first embodiment with the five fuel cells of the second embodiment and replace each of the fuel cells of the second embodiment with the five fuel cells of the first embodiment.

DESCRIPTION OF REFERENCE NUMERALS

10 . . . power generating means
11A, 11B, 11C, 11D, 11E . . . solid oxide fuel cell
12A, 12B, 12C, 12D, 12E . . . fuel electrode
13 . . . fuel gas supply conduit
14A, 14B, 14C, 14D, 14E . . . air electrode
15 . . . oxidant gas supply conduit
16, 17 . . . circulation conduit
18A, 18B, 18C, 18D, 18E, 19A, 19B, 19C, 19D, 19E . . . connecting terminal
20 . . . switching means
31 . . . fuel gas supply means
31A, 31B . . . fuel pump
31C, 32B . . . fuel flow rate adjusting device
32 . . . oxidant gas supply means
32A, 71 . . . air blower
40 . . . load detecting means (accelerator open degree sensor)
50 . . . control means
60 . . . heat insulating means (heat insulating material)
70 . . . fuel reformer
100 . . . external load device (motor)
110 . . . connecting means

The invention claimed is:

1. A fuel cell system comprising:
a power generation device including
a plurality of fuel cells that are connectable to one another in series and/or in parallel through connecting terminals, a fuel gas supply conduit through which fuel electrodes of at least two of the fuel cells are connected in series, and an oxidant gas supply conduit through which air electrodes of at least two of the fuel cells are connected in series;

a switching device that switches an electric connection condition between the connecting terminals and a connector of an external load device;

a fuel gas supply device that supplies the fuel gas supply conduit with a fuel gas and an oxidant gas supply device that supplies the oxidant gas supply conduit with an oxidant gas;

a load detecting sensor that detects a load of the external load device; and a controller configured to calculate a desired operation point based on an input from the load detecting sensor and predetermined relationships between (a) a number of mutually connected fuel cells, fuel cell operating voltage and fuel cell power output and (b) the number of mutually connected fuel cells, fuel cell operating voltage and fuel cell heat radiation output, wherein the desired operation point is a point at which a desired number of mutually connected fuel cells has a desired operating voltage, the desired operating point allowing power generation without operation of an external heat source, and control the switching device, the fuel gas supply device and the oxidant gas supply device to operate the fuel cell system at the desired operation point.

2. A fuel cell system as claimed in claim 1, wherein at least one of the fuel gas supply conduit and the oxidant gas supply conduit is equipped with a circulation conduit.

3. A fuel cell system as claimed in claim 1, wherein the plurality of fuel cells, the fuel gas supply conduit and the oxidant gas supply conduit are arranged so as to be protected by heat insulating material.

4. A fuel cell system as claimed in claim 1, wherein the controller is configured to output instructions to the switching device in accordance with a required power generation output and heat produced by the external load device.

5. A method for controlling a fuel cell system that comprises a power generation device including a plurality of fuel cells that are connectable to one another in series and/or in parallel through connecting terminals, a fuel gas supply conduit through which fuel electrodes of at least two of the fuel cells are connected in series, an oxidant gas supply conduit through which air electrodes of at least two of the fuel cells are connected in series, a switching device that switches an electric connection condition between the connecting terminals and a connector of an external load device, a fuel gas supply device that supplies the fuel gas supply conduit with a fuel gas, an oxidant gas supply device that supplies the oxidant gas supply conduit with an oxidant gas, a load detecting sensor that detects a load of the external load device, and a controller, the method comprising:

calculating a desired operation point based on an input from the load detecting sensor and predetermined relationships between (a) a number of mutually connected fuel cells, fuel cell operating voltage and fuel cell power output and (b) the number of mutually connected fuel cells, fuel cell operating voltage and fuel cell heat radiation output, wherein the desired operation point is a point at which a desired number of mutually connected fuel cells has a desired operating voltage, the desired operating point allowing power generation without operation of an external heat source, and controlling the switching device, the fuel gas supply device and the oxidant gas supply device to operate the fuel cell system at the desired operation point.

* * * * *